ically admixed, the stability of the polymer at high
3,298,993
POLYOXYMETHYLENE COMPOSITIONS STABILIZED WITH BIURETS AND PHENOLS OR AMINES Ibrahim Dakli and Dario Grazioli, Busto Arsizio, Varese, and Nino Oddo, Milan, Italy, assignors to Montecatini Edison S.p.A., Milan, Italy
No Drawing. Filed Dec. 10, 1962, Ser. No. 243,587
Claims priority, application Italy, Dec. 14, 1961, 22,359/61
3 Claims. (Cl. 260—45.9)

The present invention relates to thermally stabilized compositions containing high molecular weight polyoxymethylenes.

It is known that polyoxymethylenes possess a high degree of thermal degradation. Thus, at their melting point temperatures or above, they depolymerize to produce the monomer.

The depolymerization processes of polyoxymethylene chains may take place according to different mechanisms such as:

(1) Depolymerization commencing at the terminal hydroxy groups of the chain, and resulting in the elimination of formaldehyde molecules;

(2) Oxygen attack on the methylene groups of the polymer with the formation of peroxide groups followed by the scission or rupture of the acetal bonds of the chains;

(3) Acid attack on the C—O—C groups of the polymer by hydrogen ions. This acid attack can be caused by formaldehyde freed according to above mechanisms (1) and (2) and oxidized in the air to formic acid.

In order to improve the thermal stability of polyoxymethylenes and to permit their full usage in various applications, it is necessary to stabilize the terminal hydroxy groups of the chain. Thus, the terminal —OH groups are blocked by means of reactions with less labile groups.

Various techniques such as esterification and etherification have been used for this purpose. The polymers obtained, however, do not exhibit a sufficiently high thermal stability since degradation mechanisms (2) and (3) may still take place.

The use of various organic substances for the further stabilization of polyoxymethylenes has been proposed. Improved results are generally obtained using a normal antioxidant such as, for example, aromatic amines (e.g. $\alpha$-naphthylamine, $\beta$-naphthylamine, N,N'-diphenyl-p-phenylenediamine, diphenylamine, etc.), phenols (e.g. 4,4'-butylidene-bis(6 tert. butyl-3-methyl phenol), 2,2'-methylene-bis(4-methyl-6 tert. butyl phenol), etc.) etc., together with a substance which is capable of blocking the other degradation mechanism, such as polyamides, polyurethanes, urea, etc.

It is therefore an object of the present invention to provide novel stabilized compositions and a simple and effective method for preparing them.

Further objects and advantages of the present invention will become hereinafter apparent.

We have now surprisingly found that if the polyoxymethylene and a compound such as biuret, a polyuret, thio-biuret, a polythio-uret or their N-substituted derivatives such as N-substituted alkyl or aryl derivatives, are intimately admixed, the stability of the polymer at high temperatures is remarkably improved.

We have found that in the presence of at least one of these above-mentioned stabilizing compounds and small amounts of common amino or phenolic antioxidants, the resistance of these polymers to thermal degradation is increased. Indeed, it has been found that resistance of the polymers is even higher than that obtained with urea or with common stabilizing systems when used in the same concentrations. Moreover, the stabilizing additive of the present invention is effective even when present in very low concentrations.

Polyurets can, in general, be obtained from urea by eliminating ammonia therefrom in the presence of thionyl chloride ($SOCl_2$). As compared with urea, the decomposition of which starts at 132° C., polyurets have the advantage of remaining unaltered at higher temperatures ($\cong$ 186° C.).

The stabilizing compounds of the invention can be incorporated in the polymer using any of the known techniques suitable for obtaining a uniform dispersion of a powdered solid in a polymer. The mixing can be carried out at room temperature in a powder mixer or, at a temperature higher than the melting point of the polymer, in a roll mixer or in a screw-extruder. Another suitable technique consists of dissolving the stabilizers in a suitable solvent, impregnating the polymer with the solution thus obtained and then drying the polymer.

The stabilizing compound may be added to the polymer compositions in amounts not greater than about 15% by weight of the polymer and not less than about 0.001% by weight; amounts between 10% or 5% and 0.01% by weight are preferably used.

The polyoxymethylene compositions of the present invention may include common antioxidants. Extremely low amounts of such antioxidants are sufficient; in general, between about 5% and about 0.01% by weight of the polymer. These compositions, if desired, may also contain other additives such as plasticizers, pigments and other stabilizers, such as, for example, stabilizers to protect against the degradation induced by ultraviolet (U.V.) rays.

The thermal degradation of the polymers stabilized with the stabilizing compounds of the present invention is determined by placing about 0.1 g. of a sample in a furnace kept at 200° C., in the presence of air, and measuring the weight loss of the sample after 30 minutes and after 60 minutes. The results of the tests are expressed as $K'_{200}$, which is the percent weight loss of the polymer after 30 minutes, and $K''_{200}$, the corresponding weight loss after 60 minutes.

The viscosity data is obtained with solutions of the polymer in dimethylformamide using concentrations of 0.5 g./100 cc. at a temperature of 150° C., in the presence of diphenylamine (1 g./100 cc.).

The polymers which are stabilized in accordance with the present invention are formaldehyde polymers, i.e., homopolymers or copolymers of formaldehyde containing recurring —$CH_2O$— units in their polymeric chains.

The results of the determination are expressed by the inherent viscosity, which is defined as follows:

$$\text{Inherent viscosity} = \frac{\text{ln Relative viscosity}}{C}$$

wherein the relative viscosity is the ratio of the viscosity of the solution to the viscosity of the solvent and C is the solute concentration in g./100 cc.

The formaldehyde polymers used in the composition of the present invention are solid high molecular weight polymers having long sequences of —($CH_2O$)— units in the polymeric chain and an inherent viscosity of at least about 0.3. These polymers are produced according to the known methods from aqueous formaldehyde solutions (e.g. U.S. patent application Serial No. 168,220, filed on January 23, 1962), from anhydrous formaldehyde (e.g. U.S. patent application Serial No. 201,817, filed on June 12, 1962, now abandoned) or from trioxane (e.g. U.S. Patent No. 3,027,352).

The stabilized compositions of the present invention are particularly suitable for use in the production of films, fibers, molded articles and the like, by extrusion, injection molding and other known methods.

The following examples, wherein the abbreviations DFA and BB indicate diphenylamine and 4,4'-butylidene-bis(6-tertiary butyl-3-methyl-phenol) respectively are given to further illustrate the invention without limiting its scope:

Unless otherwise indicated, the percent of the stabilizer is based on the weight of the polymer.

*Example 1*

A polyoxymethylene dihydroxide, prepared by polymerization of anhydrous formaldehyde in an anhydrous hydrocarbon solvent by the method according to abandoned U.S. patent application Serial No. 201,817, is acetylated in the presence of acetic anhydride and of a hydrocarbon solvent. Samples of polyoxymethylene diacetate thus obtained are treated with the stabilizers listed in Table 1, by mixing the powders in a mill for 30 minutes. The inherent viscosity of the polymer before and after the treatment in the mill is 0.69.

The samples are then subjected in the manner described above to a thermal treatment at 200° C. The results presented in the following Table 1 demonstrate the higher stability of the polymer samples containing biuret.

TABLE 1

[Polyoxymethylene diacetate: inherent viscosity=0.69. Percent weight losses at 200° C. after 30 ($K'_{200}$) and 60 minutes ($K''_{200}$)]

| Sample | $K'_{200}$, Percent | $K''_{200}$, Percent |
| --- | --- | --- |
| 1—Polymer control (without stabilizer) | 41 | 77 |
| 2—Polymer plus 0.5% DFA | 9 | 26 |
| 3—Polymer plus 0.5% BB | 10 | 38 |
| 4—Polymer plus 1% urea plus 0.5% BB | 9.5 | 12 |
| 5—Polymer plus 1% biuret plus 0.5% BB | 1.2 | 3.4 |
| 6—Polymer plus 1% biuret plus 0.25% DFA | 1.4 | 2.8 |
| 7—Polymer plus 0.5% biuret plus 0.5% DFA | 1.7 | 3.3 |

*Example 2*

A polyoxymethylene dihydroxide, prepared as described in Example 1, is acetylated in the presence of acetic anhydride. The polyoxymethylene diacetate thus obtained is mixed with 2% of said tetrauret and 0.5% of solid DFA. Another sample was mixed with 3% of solid tetrauret and 0.5% of solid BB. The mixing of both the compositions was carried out with an agitator. The inherent viscosity of the polymer is 0.65.

The results of thermal degradation at 200° C. are reported in Table 2.

TABLE 2

| | $K'_{200}$, Percent | $K''_{200}$, Percent |
| --- | --- | --- |
| Polymer control (without stabilizer) | 39 | 70 |
| Polymer plus 2% tetrauret plus 0.5% DFA | 3.2 | 3.7 |
| Polymer plus 3% tetrauret plus 0.5% BB | 2.3 | 3.0 |

*Example 3*

A sample of polyoxymethylene dihydroxide is obtained by the polymerization of formaldehyde in an aqueous solution in the presence of the preformed polymer as a solid phase. At 20° C. an aqueous solution having a pH of 10 and containing 10% by weight of formaldehyde and 40% of sodium formate is contacted with a polyoxymethylene using a ratio of solid to liquid of about 1–2. A 51% aqueous formaldehyde solution and sodium formate is continuously introduced so as to maintain constant the formaldehyde and formate concentration in the liquid phase. A concentrated sodium hydroxide solution is continuously introduced so as to keep the pH in the liquid phase constant. An amount of solid plus liquid, in the same ratios as present in the reaction phase, and equal to amounts of the particular substances introduced, is continuously discharged. The polyoxymethylene produced is dried and acetylated as in Example 2.

The polyoxymethylene diacetate thus obtained is treated with a solution of biuret and BB in ethanol. The solution used contained 1% of biuret and 0.5% of BB by weight of the polymer. The alcohol was then evaporated by maintaining the sample at 65° C. under vacuum for 4 hours. The polymer itself has an inherent viscosity of 0.69. The results of thermal degradation at 200°C. are reported in Table 3.

TABLE 3

| | $K'_{200}$, Percent | $K''_{200}$, Percent |
| --- | --- | --- |
| Polymer control (without stabilizer) | 25 | 50 |
| Polymer plus 1% biuret plus 0.5% BB | 1.8 | 2.0 |

*Example 4*

A polyoxymethylene diacetate, prepared as described in Example 3, is admixed with 1% of phenylmonothiobiuret having the formula $$C_6H_5—NH—CO—NH—CS—NH_2$$

and 0.25% of DFA. The mixing is carried out in a powder mixer. The inherent viscosity of the polymer is 0.65. The results of thermal degradation at 200° C. are reported in Table 4.

TABLE 4

| | $K'_{200}$, Percent | $K''_{200}$, Percent |
| --- | --- | --- |
| Polymer control (without stabilizer) | 30 | 56 |
| Sample plus 1% phenylmonothiobiuret plus 0.25% DFA | 1.5 | 3.0 |

Many variations and modifications can, of course, be practiced without departing from the spirit and scope of the present invention.

Having described the present invention, what we now desire to secure and claim by Letters Patent is:

1. A thermally stable composition comprising (1) a high molecular weight polyoxymethylene homopolymer having an inherent viscosity, as determined in dimethylformamide at 150° C. at a concentration of 0.5% by weight, of at least 0.3, (2) from about 0.01 to 10% by weight, based on the weight of said homopolymer, of a compound selected from the group consisting of biuret, tetrauret, thiobiuret and phenylmonothiobiuret, $C_6H_5$—NH—CO—NH—CS—$NH_2$, and (3) from about 0.01 to 5% by weight, based on the weight of said homopolymer of a compound selected from the group consisting of alpha-naphthylamine, beta-naphthylamine, N,N'-diphenyl-p-phenylenediamine, diphenylamine, 4,4' butylidene-bis (6 tert.butyl-3-methyl phenol) and 2,2'-methylene-bis (4 methyl-6 tert.butyl phenol).

2. The composition of claim 1, wherein the polyoxymethylene contains terminal acyl groups.

3. The composition of claim 1, wherein the polyoxymethylene contains terminal ether groups.

References Cited by the Examiner

UNITED STATES PATENTS

| 2,304,369 | 12/1942 | Morgan et al. | 260—553 |
| 2,810,708 | 5/1957 | Kubico | 260—45.9 |
| 2,813,783 | 11/1957 | Gleim | 260—45.9 |
| 2,893,972 | 7/1959 | Kubico | 260—45.9 |
| 2,966,476 | 12/1960 | Kralovec et al. | 260—45.9 |
| 2,989,508 | 6/1961 | Hudgin | 260—45.9 |

FOREIGN PATENTS

| 216,218 | 7/1961 | Austria. |
| 839,864 | 5/1952 | Germany. |
| 835,518 | 5/1960 | Great Britain. |

LEON J. BERCOVITZ, *Primary Examiner.*

DONALD E. CZAJA, *Examiner.*

H. E. TAYLOR, *Assistant Examiner.*